US012632085B2

(12) United States Patent
Lee et al.

(10) Patent No.: US 12,632,085 B2
(45) Date of Patent: May 19, 2026

(54) DISPLAY ASSEMBLY FOR WEARABLE COMPUTING DEVICES

(71) Applicant: Google LLC, Mountain View, CA (US)

(72) Inventors: Choongho Lee, San Diego, CA (US); Sangmoo Choi, Palo Alto, CA (US); Gang Cheng, Burlingame, CA (US); Chih-Chun Chang, Hsinchu-City (TW)

(73) Assignee: GOOGLE LLC, Mountain View, CA (US)

( * ) Notice: Subject to any disclaimer, the term of this patent is extended or adjusted under 35 U.S.C. 154(b) by 120 days.

(21) Appl. No.: 18/691,640

(22) PCT Filed: Apr. 19, 2023

(86) PCT No.: PCT/US2023/019086
§ 371 (c)(1),
(2) Date: Mar. 13, 2024

(87) PCT Pub. No.: WO2024/196382
PCT Pub. Date: Sep. 26, 2024

(65) Prior Publication Data
US 2025/0231583 A1     Jul. 17, 2025

Related U.S. Application Data

(60) Provisional application No. 63/491,411, filed on Mar. 21, 2023.

(51) Int. Cl.
*G06F 1/16* (2006.01)
*G04G 9/00* (2006.01)
*G04G 17/04* (2006.01)

(52) U.S. Cl.
CPC ............. *G06F 1/163* (2013.01); *G04G 9/007* (2013.01); *G04G 17/045* (2013.01)

(58) Field of Classification Search
CPC ...................................................... G06F 1/163
See application file for complete search history.

(56) References Cited

U.S. PATENT DOCUMENTS 9,429,997 B2 * 8/2016 Myers ................... G06F 3/0487
11,175,769 B2 * 11/2021 Prest ................... G06F 3/04817
(Continued)

FOREIGN PATENT DOCUMENTS

WO     WO 2022/132370     6/2022

OTHER PUBLICATIONS

International Search Report and Written Opinion for Application No. PCT/US2023/019086, mailed Nov. 28, 2023, 12 pages.

*Primary Examiner* — Adrian S Wilson
(74) *Attorney, Agent, or Firm* — DORITY & MANNING P.A.

(57) ABSTRACT

A display assembly includes a three-dimensional display cover defining an internal volume. The three-dimensional display cover includes a central portion and a peripheral portion. The peripheral portion extends around a periphery of the internal volume. The display assembly includes a first display and a second display. The first display is disposed within the internal volume of the three-dimensional display cover and is visible through the central portion of the three-dimensional display cover. The second display is disposed within the internal volume of the three-dimensional display cover and extends around at least a portion of a periphery of the first display. Furthermore, the second display is visible through the peripheral portion of the three-dimensional display cover.

13 Claims, 11 Drawing Sheets

(56)          References Cited

U.S. PATENT DOCUMENTS

| | | | |
|---|---|---|---|
| 11,493,958 B1 | 11/2022 | Kakuda et al. | |
| 11,829,205 B2 * | 11/2023 | Bushnell | H10K 77/111 |
| 2013/0076612 A1 * | 3/2013 | Myers | G06F 3/04817 |
| | | | 29/729 |
| 2013/0328792 A1 * | 12/2013 | Myers | G06F 1/1656 |
| | | | 345/173 |
| 2015/0349403 A1 * | 12/2015 | Tanaka | H01Q 1/273 |
| | | | 343/702 |
| 2016/0109852 A1 | 4/2016 | Kuwabara et al. | |
| 2016/0378071 A1 * | 12/2016 | Rothkopf | A61B 5/0295 |
| | | | 368/10 |
| 2017/0082982 A1 | 3/2017 | Cho et al. | |
| 2019/0042066 A1 | 2/2019 | Kim et al. | |
| 2019/0377385 A1 | 12/2019 | Bushnell | |
| 2020/0393920 A1 | 12/2020 | Kim et al. | |
| 2022/0310706 A1 | 9/2022 | Yi et al. | |

* cited by examiner

DISPLAY ASSEMBLY FOR WEARABLE COMPUTING DEVICES

PRIORITY CLAIM

The present application is based upon and claims the right of priority under 35 U.S.C. § 371 to International Application No. PCT/US2023/019086 filed on Apr. 19, 2023, which claims priority to U.S. Provisional Application Ser. No. 63/491,411, titled "Display Assembly for Wearable Computing Devices," having a filing date of filed Mar. 21, 2023. Applicant claims priority to and the benefit of each of such applications and incorporates all such applications herein by reference in their entirety.

FIELD

The present disclosure relates generally to display assemblies for wearable computing devices. More particularly, the present disclosure relates to a display assembly that includes a three-dimensional cover glass and two separate displays.

BACKGROUND

Wearable computing devices (e.g., wrist watches) can include a display for displaying content (e.g., time, date, applications, etc.) to a user. Wearable computing devices can gather data regarding activities performed by the user, or regarding the user's physiological state. Such data may include data representative of the ambient environment around the user or the user's interaction with the environment. For example, the data can include motion data regarding the user's movements and/or physiological data obtained by measuring various physiological characteristics of the user, such as heart rate, perspiration levels, and the like.

SUMMARY

Aspects and advantages of implementations of the present disclosure will be set forth in part in the following description, or can be learned from the description, or can be learned through practice of the implementations.

In one aspect of the proposed solution, a display assembly is provided. The display assembly includes a three-dimensional display cover defining an internal volume. The three-dimensional display cover includes a central portion and a peripheral portion. The peripheral portion extends around a periphery of the internal volume. The display assembly includes a first display and a second display. The first display is disposed within the internal volume of the three-dimensional display cover and is visible through the central portion of the three-dimensional display cover. The second display is disposed within the internal volume of the three-dimensional display cover and extends around at least a portion of a periphery of the first display. Furthermore, the second display is visible through the peripheral portion of the three-dimensional display cover.

In some implementations, the first display is associated with the central portion of the three-dimensional display cover and the second display is associated with the peripheral portion of the three-dimensional display cover so that the first display may only be visible through the central portion of the three-dimensional display cover and the second display may only be visible through the peripheral portion of the three-dimensional display cover.

In some implementations, the first display is coupled to the central portion of the three-dimensional display cover and the second display is coupled to the peripheral portion of the three-dimensional display cover.

In some implementations, the display assembly includes a light blocking material disposed between the first display and the second display within the internal volume of the three-dimensional display cover. Furthermore, in such implementations, the light blocking material extends around the periphery of the first display. In some implementations, the light blocking material includes an opaque material.

In some implementations, the second display extends around a portion of the periphery of the first display such that a gap is defined between a first end of the second display and a second end of the second display. For instance, in some implementations, the second display may circumferentially extend around at least a portion of the periphery of the first display such that a gap is defined between opposing circumferential ends (e.g., first end and second end) of the second display.

In some implementations, the display assembly can include a non-pixelated region that extends from the second display to an edge of the three-dimensional display cover. Furthermore, in some implementations, a height of the second display is greater than a height of the non-pixelated region and/or a height of the non-pixelated region is less than 1 millimeter.

In some implementations, the display assembly includes one or more display driver circuit configured to control a first plurality of pixels included in the first display and a second plurality of pixels included in the second display.

In some implementations, a total number of pixels included in the first display is different from a total number of pixels included in the second display. For instance, in some implementations, the first display includes a greater number of pixels than the second display. In alternative implementations, the second display includes a greater number of pixels than the second display.

In some implementations, the first display being associated with the central portion of the three-dimensional display cover is larger than the second display associated with the peripheral portion of the three-dimensional display cover.

In another aspect of the proposed solution, a wearable computing device is provided. The wearable computing device includes a housing couplable to a user. The wearable computing device further includes a display assembly coupled to the housing. The display assembly includes a three-dimensional display cover defining an internal volume. The three-dimensional display cover includes a central portion and a peripheral portion. The peripheral portion extends around a periphery of the internal volume. The display assembly includes a first display and a second display. The first display is disposed within the internal volume of the three-dimensional display cover and is visible through the central portion of the three-dimensional display cover. The second display is disposed within the internal volume of the three-dimensional display cover and extends around at least a portion of a periphery of the first display. Furthermore, the second display is visible through the peripheral portion of the three-dimensional display cover.

In some implementations, the wearable computing device includes the housing and a display assembly of the proposed solution.

In some implementations, the first display is coupled to the central portion of the three-dimensional display cover and the second display is coupled to the peripheral portion of the three-dimensional display cover.

In some implementations, the display assembly includes a light blocking material disposed between the first display and the second display within the internal volume of the three-dimensional display cover. Furthermore, in such implementations, the light blocking material extends around the periphery of the first display. In some implementations, the light blocking material includes an opaque material.

In some implementations, the second display extends around a portion of the periphery of the first display such that a gap is defined between a first end of the second display and a second end of the second display.

In some implementations, the display assembly includes a non-pixelated region that extends from the second display to an edge of the three-dimensional display cover. Furthermore, a height of the second display is greater than a height of the non-pixelated region.

In some implementations, the display assembly includes one or more display driver circuit configured to control a first plurality of pixels included in the first display and a second plurality of pixels included in the second display.

In some implementations, at least one of the first display or the second display includes an organic light emitting diode (OLED) display.

These and other features, aspects, and advantages of various implementations of the present disclosure will become better understood with reference to the following description and appended claims. The accompanying drawings, which are incorporated in and constitute a part of this specification, illustrate example implementations of the present disclosure and, together with the description, serve to explain the related principles.

BRIEF DESCRIPTION OF THE DRAWINGS

Detailed discussion of implementations directed to one of ordinary skill in the art is set forth in the specification, which makes reference to the appended figures, in which.

DETAILED DESCRIPTION

Figure 1:
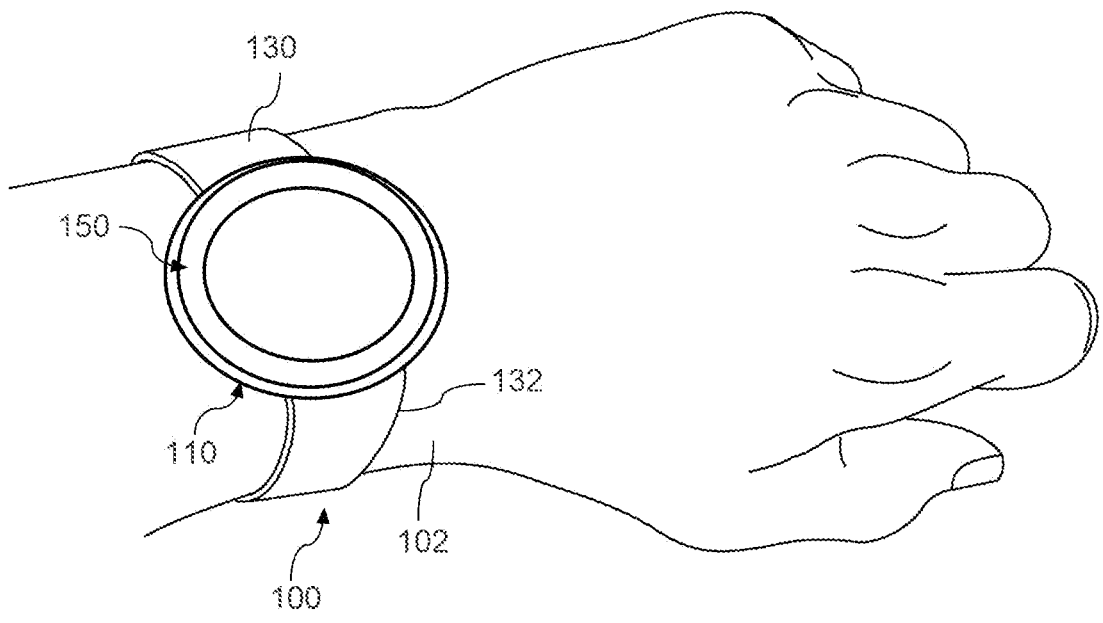
FIG. 1 depicts a wearable computing device according to an implementation of the present disclosure.

Reference now will be made in detail to implementations of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one implementation can be used with another implementation to yield a still further implementation. Thus, it is intended that the present invention covers such modifications and variations as come within the scope of the appended claims and their equivalents.

Example aspects of the present disclosure are directed to a display assembly for a wearable computing device that can be worn, for instance, on a user's wrist. The display assembly can include a first display (e.g., main display) and a second display (e.g., sub display) that is separate (e.g., spaced apart) from the first display. It should be appreciated that the first display can include a first plurality of pixels and the second display can include a second plurality of pixels. In this manner, the first plurality of pixels of the first display can be controlled (e.g., activated or deactivated) to display content for viewing on the first display. Likewise, the second plurality of pixels of the second display can be controlled to display content for viewing on the second display.

In some implementations, the second display can extend around at least a portion of a periphery of the first display. For instance, the second display can extend from a first end and around the periphery of the first display to a second end. In implementations in which the second display extends around less than the entire periphery of the first display, it should be appreciated that a gap is defined between the first and second ends of the second display. In some implementations, the gap defined between the first and second ends of the second display can be located at a particular location on an analog clock. For instance, the gap can be located at the 3 o'clock location on the analog clock. It should be understood, however, that the gap can be positioned at any suitable location on the analog clock.

The display assembly can further include a three-dimensional display cover. The three-dimensional display cover can define an internal volume in which the first display and the second display can be at least partially positioned. In this manner, the three-dimensional display cover can protect the first display and the second display from being damaged (scratched or cracked).

In some implementations, the three-dimensional display cover can include a central portion positioned above the first display. More particularly, the central portion can be positioned directly above the first display. Furthermore, a periphery of the central portion of the three-dimensional display cover can correspond (e.g., is the same as) to the periphery of the first display.

The three-dimensional display cover can further include a peripheral portion. The peripheral portion can extend around a periphery of the internal volume of the three-dimensional display cover. Stated another way, the peripheral portion of the three-dimensional display cover can include any region of the three-dimensional display cover that is positioned beyond the periphery of the first display.

In some implementations, the first display can be coupled (e.g., laminated) to the central portion of the three-dimensional display cover and the second display can be coupled (e.g., laminated) to the peripheral portion of the three-dimensional display cover. In this manner, the user wearing the wearable computing device can view content displayed by the first display through the central portion of the three-dimensional display cover. Additionally, the user can view content displayed by the second display through the peripheral portion of the three-dimensional display cover.

In some implementations, the display assembly can include an opaque material coupled to the peripheral portion of the three-dimensional display cover. The opaque material can be positioned between the first display and the second display. More particularly, the opaque material can fill the gap defined between the first display and the second display. Furthermore, the opaque material can extend around a circumference of the three-dimensional display cover. In this manner, the opaque material can prevent a user from viewing the internal volume of the three-dimensional display cover through the gap defined between the first display and the second display. It should be appreciated that, in alternative implementations, a semi-transparent material can be used in place of the opaque material. Furthermore, in such implementations, it should be appreciated that the interior volume of the three-dimensional display cover may be partially visible to the user through the gap defined between the first display and the second display.

A wearable computing device having a display assembly according to example aspects of the present disclosure can provide numerous technical effects and benefits. For instance, the second display can allow a user wearing the wearable computing device to view content through the peripheral portion of the three-dimensional display cover. In this manner, more content can be viewed through a greater portion of the three-dimensional cover compared to wearable computing devices having a three-dimensional display cover and a single display coupled to the central portion of the three-dimensional display cover. Furthermore, different content or different parts of one content can be displayed separately at the first and second display to be view from a user through different portion (e.g., central portion and peripheral portion) of the three-dimensional display cover. Thereby, the display assembly according to example aspects of the present disclosure can provide greater flexibility in how content is presented to a user.

Figure 2:
FIG. 2 depicts a cross-sectional view of a wearable computing device according to an implementation of the present disclosure.
Figure 2:
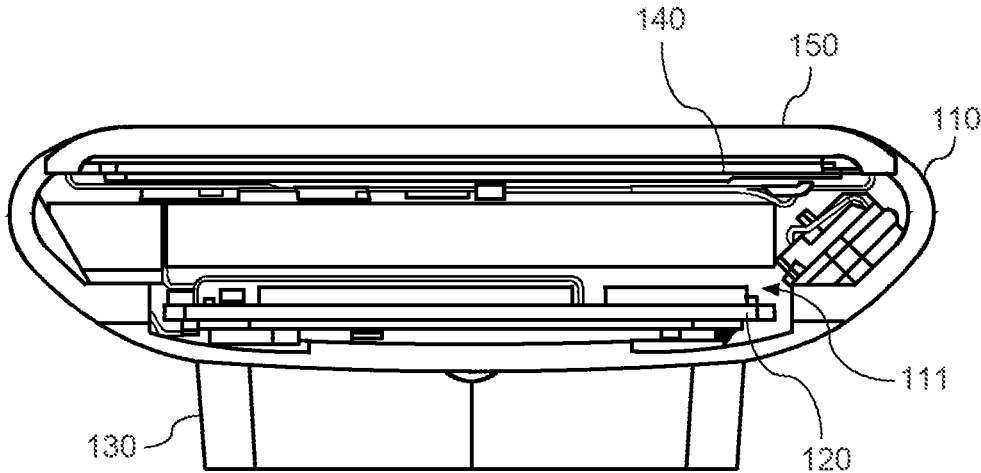
Figure 3:
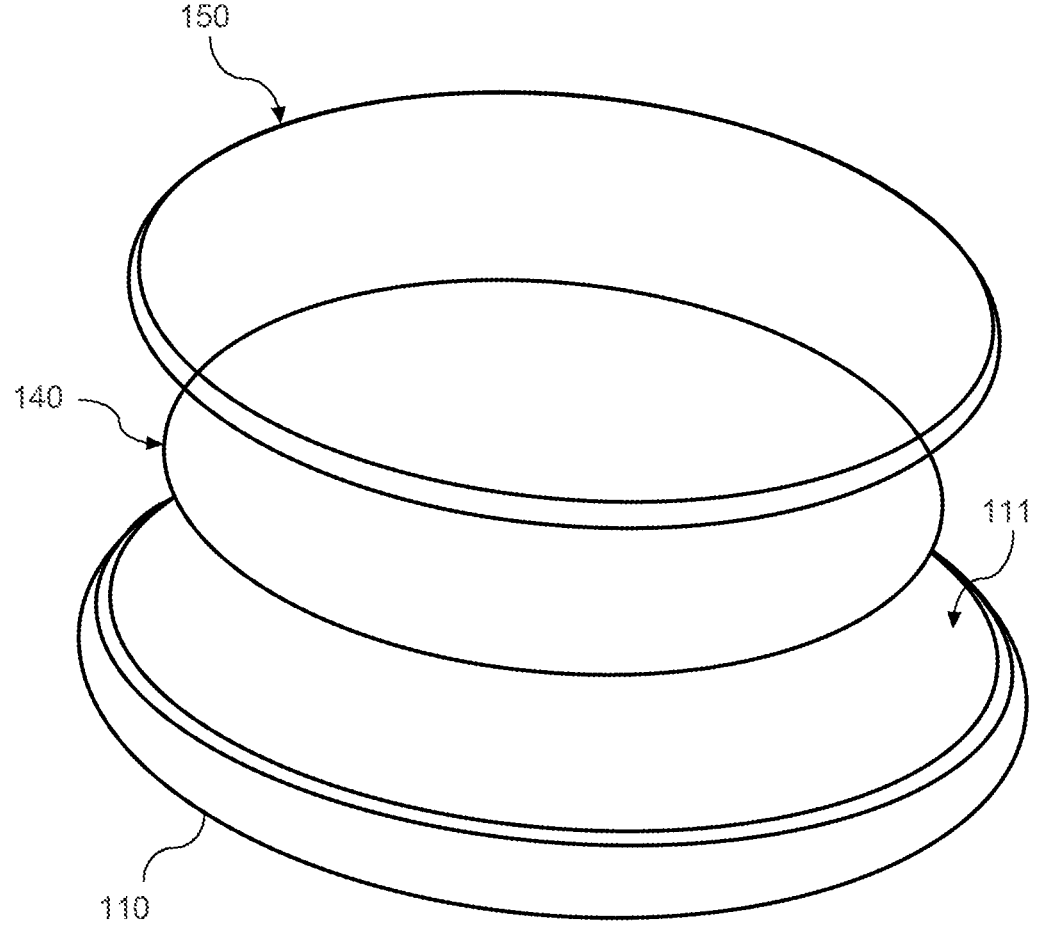
FIG. 3 depicts an exploded view of a wearable computing device according to an implementation of the present disclosure.

Referring now to the FIGS., FIGS. 1 through 3 depict a wearable computing device 100 according to an implementation of the present disclosure. As shown, the wearable computing device 100 can be worn, for instance, on an arm 102 (e.g., wrist) of a user. The wearable computing device 100 can include a housing 110 defining a cavity 111 in which one or more electronic components (e.g., disposed on printed circuit boards) are disposed. For instance, the wearable computing device 100 can include a printed circuit board 120 (e.g., flexible printed circuit board) disposed within the cavity 111. Furthermore, one or more electronic components can be disposed on the printed circuit board 120. The wearable computing device 100 can further include a battery (not shown) that is disposed within the cavity 111 defined by the housing 110.

The wearable computing device 100 can include a first band 130 and a second band 132. As shown, the first band 130 can be coupled to the housing 110 at a first location thereon. Conversely, the second band 132 can be coupled to the housing 110 at a second location thereon. Furthermore, the first band 130 and the second band 132 can be coupled to one another to secure the housing 110 to the arm 102 of the user.

In some implementations, the first band 130 can include a buckle or clasp (not shown). Additionally, the second band 132 can include a plurality of apertures (not shown) spaced apart from one another along a length of the second band 132. In such implementations, a prong of the buckle associated with the first band 130 can extend through one of the plurality of openings defined by the second band 132 to couple the first band 130 to the second band 132.

It should be appreciated that the first band 130 can be coupled to the second band 132 using any suitable type of fastener. For instance, in some implementations, the first band 130 and the second band 132 can include a magnet. In such implementations, the first band 130 and the second band 132 can be magnetically coupled to one another to secure the housing 110 to the arm 102 of the user.

As shown, the wearable computing device 100 includes a display 140. The display 140 can display content (e.g., time, date, biometric, notifications, etc.) for viewing by the user. It should be understood that the display 140 can include any suitable type of display. For instance, in some implementations, the display 140 can be an OLED display.

The wearable computing device 100 can include a cover 150 positioned on top of the display 140. In this manner, the cover 150 can protect the display 140 from being damaged (e.g., scratched or cracked). In some implementations, the wearable computing device 100 can include a seal (not shown) positioned between the housing 110 and the cover 150. For instance, a first surface of the seal can contact the housing 110 and a second surface of the seal can contact the cover 150. In this manner, the seal between the housing 110 and the cover 150 can prevent a liquid (e.g., water) from entering the cavity 111 defined by the housing 110.

It should be understood that the cover 150 can be optically transparent so that the user can view information being displayed on the display 140. For instance, in some implementations, the cover 150 can include a glass material. It should be understood, however, that the cover 150 can include any suitable optically transparent material.

Figure 4:
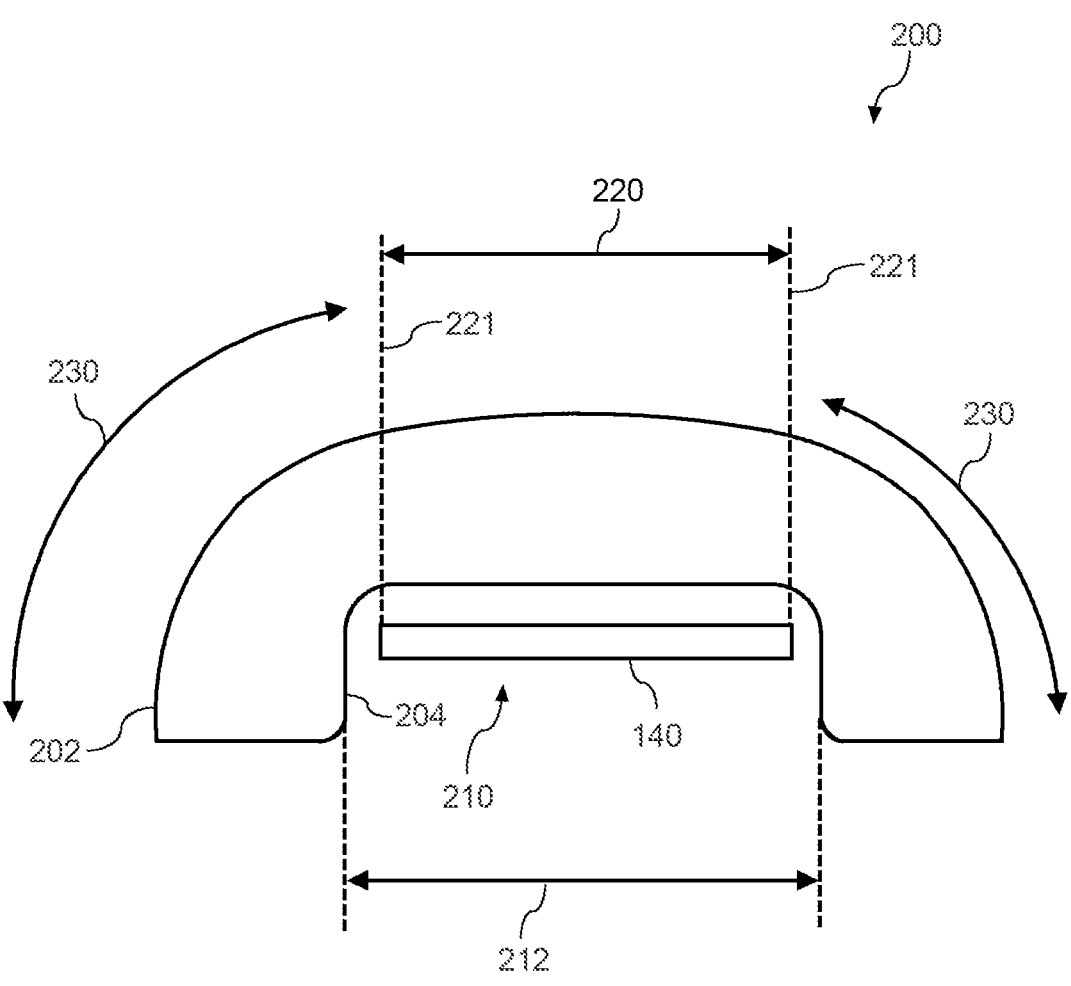
FIG. 4 depicts a cross-sectional view of a three-dimensional display cover for a display of a wearable computing device.

Referring now to FIG. 4, a cross-sectional view of a three-dimensional display cover 200 is provided according to an implementation of the present disclosure. It should be understood that the three-dimensional display cover 200 can be used to protect the display 140 of the wearable computing device 100 (FIG. 1). More particularly, the three-dimensional display cover 200 can be used in place of the cover 150 discussed above with reference to FIGS. 1 and 2. Details of the three-dimensional display cover 20 will now be discussed in more detail.

The three-dimensional display cover 200 can include an exterior surface 202 and an interior surface 204. Furthermore, the three-dimensional display cover 200 can define an internal volume 210 in which the display 140 is positioned. As shown, the interior surface 204 of the three-dimensional display cover 200 may be shaped to cover the internal volume 210. For example, the interior surface 204 of the three-dimensional display cover can define a recess (e.g., internal volume 210) in which the display 140 is at least partially positioned.

The three-dimensional display cover 200 can include a central portion 220. The central portion 220 can include a region of the three-dimensional display cover 200 that is positioned above the display 140. More particularly, the central portion 220 can be positioned directly above the display 140. Furthermore, a periphery 221 of the central portion 220 of the three-dimensional display cover corresponds (e.g., is the same as) to the periphery of the display 140. In this manner, touch input provided by a user's finger 104 touching the central portion 220 of the three-dimensional display cover 200 can be detected by the display 140.

The three-dimensional display cover 200 further includes a peripheral portion 230. The peripheral portion 230 extends around a periphery 212 of the internal volume 210 of the three-dimensional display cover 200. Stated another way, the peripheral portion 230 of the three-dimensional display cover 200 includes any region of the three-dimensional display cover 200 that is circumferentially positioned beyond the periphery of the display 140.

As shown, the three-dimensional display cover 200 can have a shape corresponding to a dome. It should be understood, however, that the three-dimensional display cover 200 can have any suitable shape. For instance, in some implementations, the central portion 220 of the three-dimensional display cover 200 can be flat. Alternatively, or additionally, the peripheral portion 230 of the three-dimensional display cover 200 can be arcuate.

Figure 5:
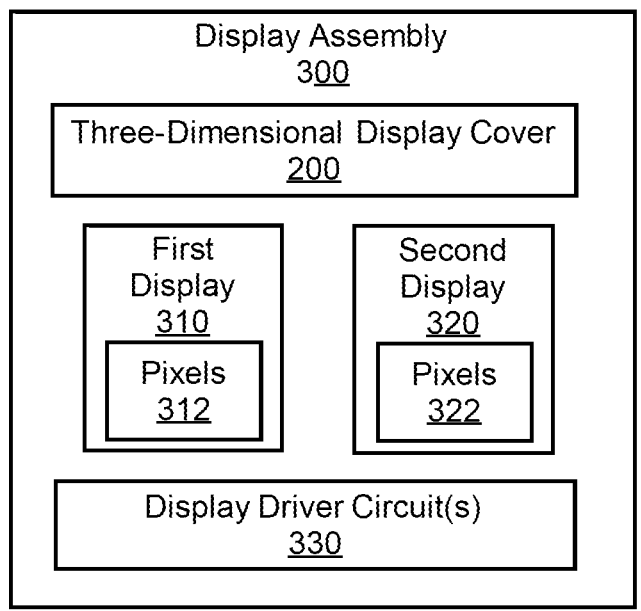
FIG. 5 depicts a block diagram of components of a display assembly according to an implementation of the present disclosure.

Referring now to FIG. 5, a block diagram of components of a display assembly 300 for use with a wearable computing device is provided according to an implementation of the present disclosure. The display assembly 300 can include the three-dimensional display cover 200 discussed above with reference to FIG. 4. The display assembly 300 can further include a first display 310 having a first plurality of pixels 312 and a second display 320 having a second plurality of pixels 322. In some implementations, the total number of pixels included in the first plurality of pixels 312 can be different (that is, more or less) from the total number of pixels included in the second plurality of pixels 322. In some implementations, at least one of the first display 310 or the second display 320 can include an OLED display.

It should be appreciated that the first display 310 and the second display 320 can have any suitable shape. For instance, in some implementations, the first display 310 can be disc-shaped and the second display 320 can be ring-shaped. It should be appreciated that, in some implementations, the ring-shape of the second display is not continuous. Stated another way, the second display 320 can, as will be discussed below in more detail, include a gap defined between opposing ends of the second display 320.

In some implementations, the display assembly 300 can include one or more display driver circuits 330. For instance, in some implementations, the display assembly 300 can include a first display driver circuit configured to control (e.g., activate or deactivate) the first plurality of pixels 312 to cause the first display 310 to display content. Additionally, the display assembly 300 can include a second display driver circuit configured to control the second plurality of pixels 322 to cause the second display 320 to display content. In this manner, the first display 310 and the second display 320 can be independently controlled.

Figure 6:
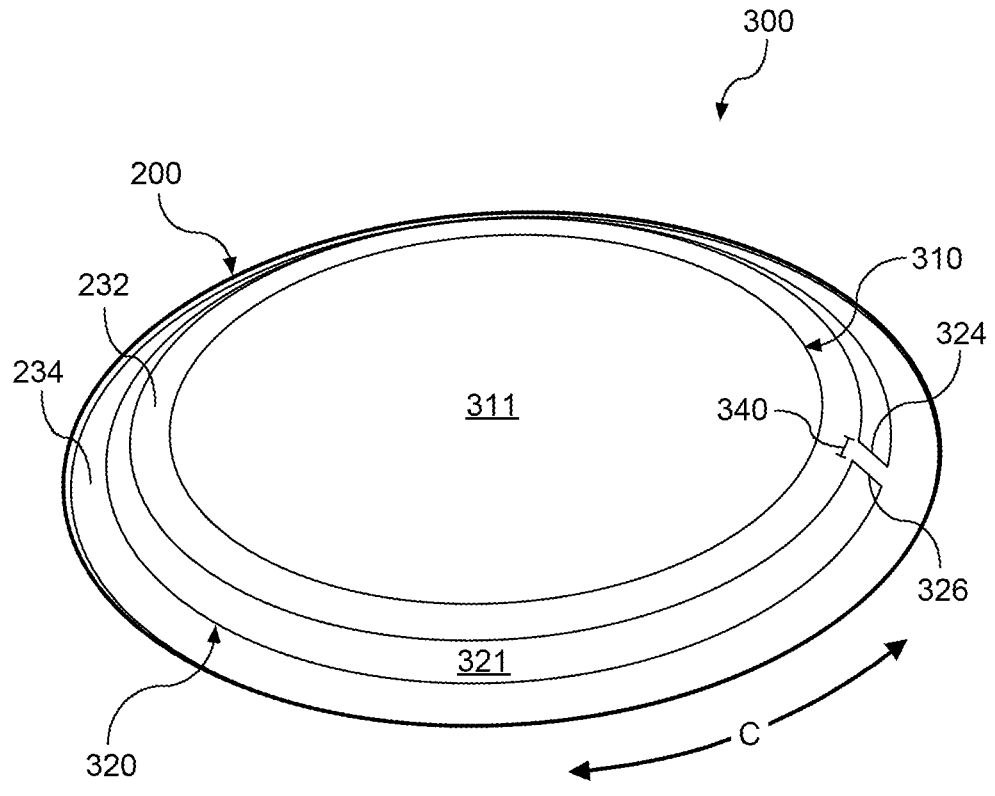
FIG. 6 depicts a perspective view of a display assembly according to an implementation of the present disclosure.
Figure 7:
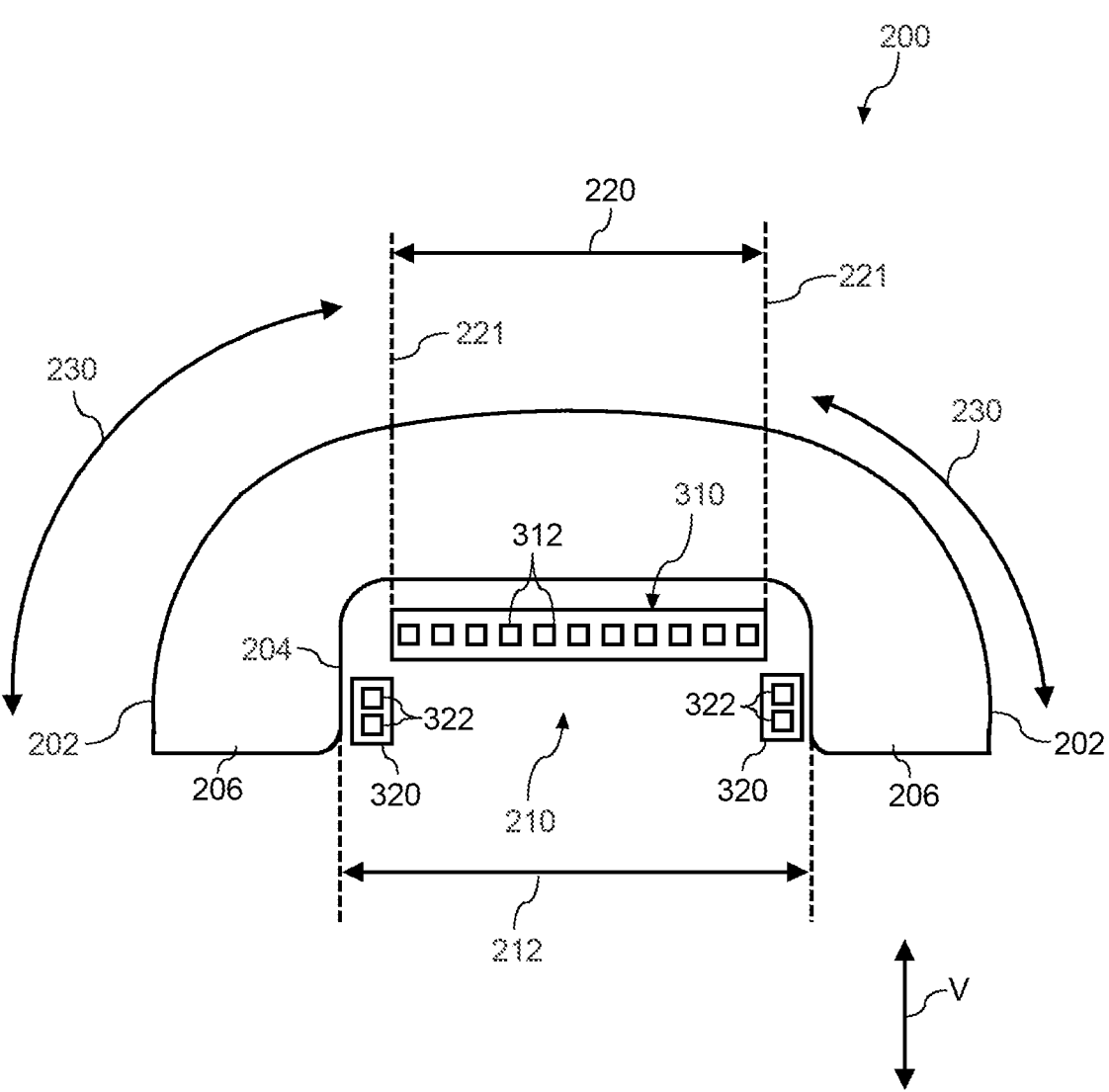
FIG. 7 depicts a cross-sectional view of the display assembly of FIG. 6 according to an implementation of the present disclosure.
Figure 8:
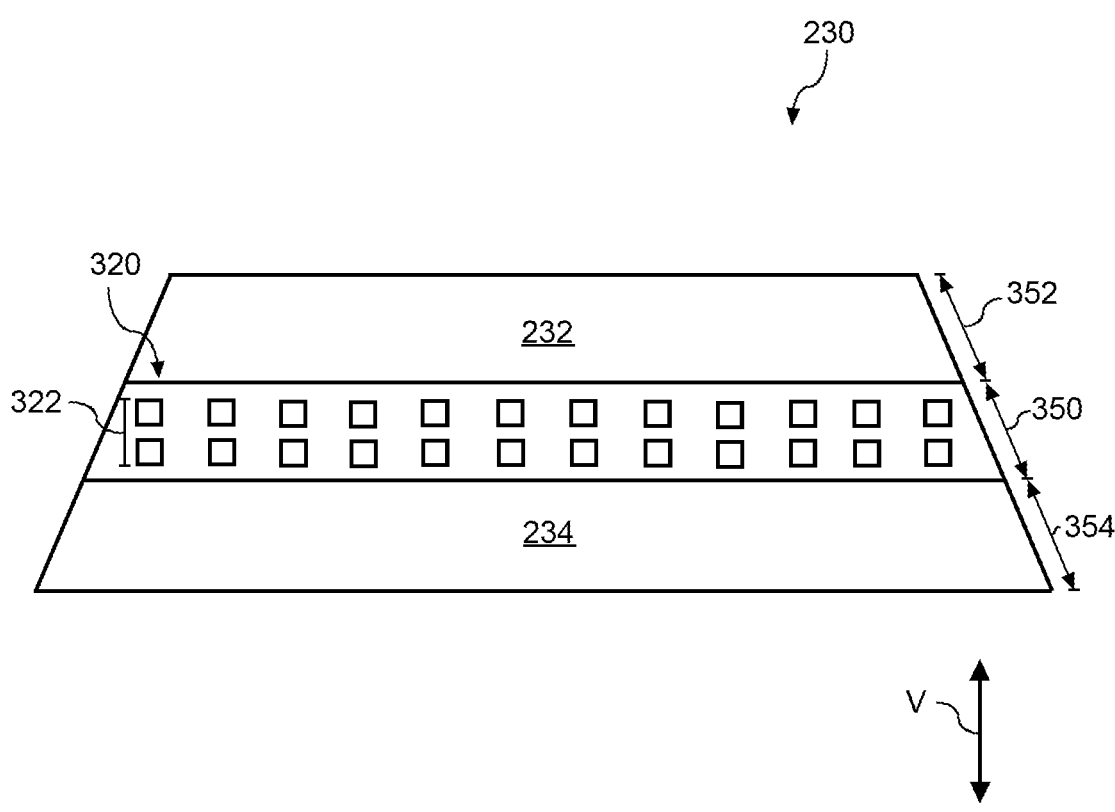
FIG. 8 depicts a peripheral portion of a three-dimensional display cover of the display assembly of FIG. 6 according to an implementation of the present disclosure.

Referring now to FIGS. 6 through 8, the display assembly 300 for a wearable computing device is provided according to some implementations of the present disclosure. As shown, the first display 310 is disposed within the internal volume 210 of the three-dimensional display cover 200 such that a display surface 311 of the first display 310 is visible through the central portion 220 of the three-dimensional display cover 200. Furthermore, in some implementations, the display surface 311 of the first display 310 can be coupled to the central portion 220 of the three-dimensional display cover 200. For instance, in some implementations, the display surface 311 of the first display 310 can be laminated to the central portion 220 of the three-dimensional display cover 200. It should be appreciated, however, that the display surface 311 of the first display 310 can be coupled to the central portion 220 of the three-dimensional display cover 200 in any suitable manner. It should also be appreciated the display surface 311 of the first display 310 refers to the surface of the first display 310 that displays content for viewing the user wearing the wearable computing device.

The second display 320 is disposed within the internal volume 210 of the three-dimensional display cover 200 such that a display surface 321 of the second display is visible through the peripheral portion 230 of the three-dimensional display cover 200. Furthermore, in some implementations, the display surface 321 of the second display 320 can be coupled to the peripheral portion 230 of the three-dimensional display cover 200. For instance, in some implementations, the display surface 321 of the second display 320 can be laminated to the peripheral portion 230 of the three-dimensional display cover 200. It should be appreciated that the display surface 321 of the second display 320 can be coupled to the peripheral portion 230 of the three-dimensional display cover 200 in any suitable manner.

The second display 320 extend around at least a portion of a periphery of the first display 310. As shown, in implementations in which the three-dimensional display cover 200 has a dome-shape, the second display 320 extends along a circumferential direction C of the three-dimensional display cover 200 to extend along at least a portion of the periphery of the first display 310. It should be appreciated that the periphery of the first display 310 can correspond to (e.g., may be the same as) the periphery 221 of the central portion 220 of the three-dimensional display cover 200.

In some implementations, an outwardly facing display surface (e.g., display surface 321) of the second display 320 can be oriented at an angle with an outwardly facing display surface (e.g., display surface 311) of the first display 310. In this manner, the outwardly facing display surface of the second display 320 is visible through the peripheral portion 230 of the three-dimensional display cover 200 and the outwardly facing display surface of the first display 310 is visible through the central portion 220 of the three-dimensional display cover 200. For instance, in some implementations, the angle ranges from 30 degrees to 90 degrees.

In some implementations, the second display 320 can extend around less than the entire periphery of the first display 310. In such implementations, a gap 340 is defined between a first end 324 of the second display 320 and a second end 326 of the second display 320. In some implementations, a location of the gap 340 can correspond to a particular location on an analog clock. For instance, in some implementations, the gap 340 can correspond to the 3 o'clock position on the analog clock. It should be appreciated, however, that the gap 340 can be positioned at any suitable location on the analog clock. In some implementations, a width of the gap 340 can be in a range of 1 millimeter to 5 millimeters.

The second display 320 is spaced apart from the first display 310 within the internal volume 210 of the three-dimensional display cover 200. More particularly, the second display 320 is positioned beneath the first display 310 along a vertical direction V of the three-dimensional display cover 200. In this manner, a first region 232 of the peripheral portion 230 of the three-dimensional display cover 200 can be positioned between the first display 310 and the second display 320. It should be appreciated that the vertical direction V is substantially perpendicular (e.g., within 10 degrees of perpendicular, within 5 degrees of perpendicular, within 1 degree of perpendicular) to the display surface 311 of the first display 310 that is positioned within the internal volume 210 of the three-dimensional display cover 200.

In some implementations, the second display 320 can be spaced apart from an edge 206 (e.g., bottom) of the three-dimensional display cover 200 that extends from the exterior surface 202 of the three-dimensional display cover 200 to the interior surface 204 of the three-dimensional display cover 200. In this manner, a second region 234 of the peripheral portion 230 of the three-dimensional display cover 200 can be positioned between the second display 320 and the edge 206 of the three-dimensional display cover 200. It should be appreciated that the first and second regions 232, 234 of the peripheral portion 230 of the three-dimensional display cover 200 can be considered non-pixelated regions of the display assembly 300.

In some implementations, the second display 320 can be taller than the first region 232 of the peripheral portion 230 of the three-dimensional display cover 200. Additionally, the second display 320 can also be taller than the second region 234 of the peripheral portion 230 of the three-dimensional display cover 200. In this manner, the second display 320 can occupy a majority of the peripheral portion 230 of the three-dimensional display cover 200.

It should be understood that the second display 320, the first region 232 of the peripheral portion 230, and the second region 234 of the peripheral portion 230 can have any suitable height. For instance, in some implementations, a height 350 of the second display 320 (e.g., measured along the vertical direction V) can be in a range of 1.6 millimeters to 2.6 millimeters. Alternatively, or additionally, a height 352 of the first region 232 of the peripheral portion 230 of the three-dimensional display cover 200 can be in a range of 0.1 millimeters to 1.5 millimeters. Furthermore, in some implementations, a height 354 of the second region 234 of the peripheral portion 230 of the three-dimensional display cover 200 can be less than 1 millimeter. In this manner, the second region 234 (e.g., non-pixelated region) of the peripheral portion 230 of the three-dimensional display cover 200 can be minimized.

Figure 9:
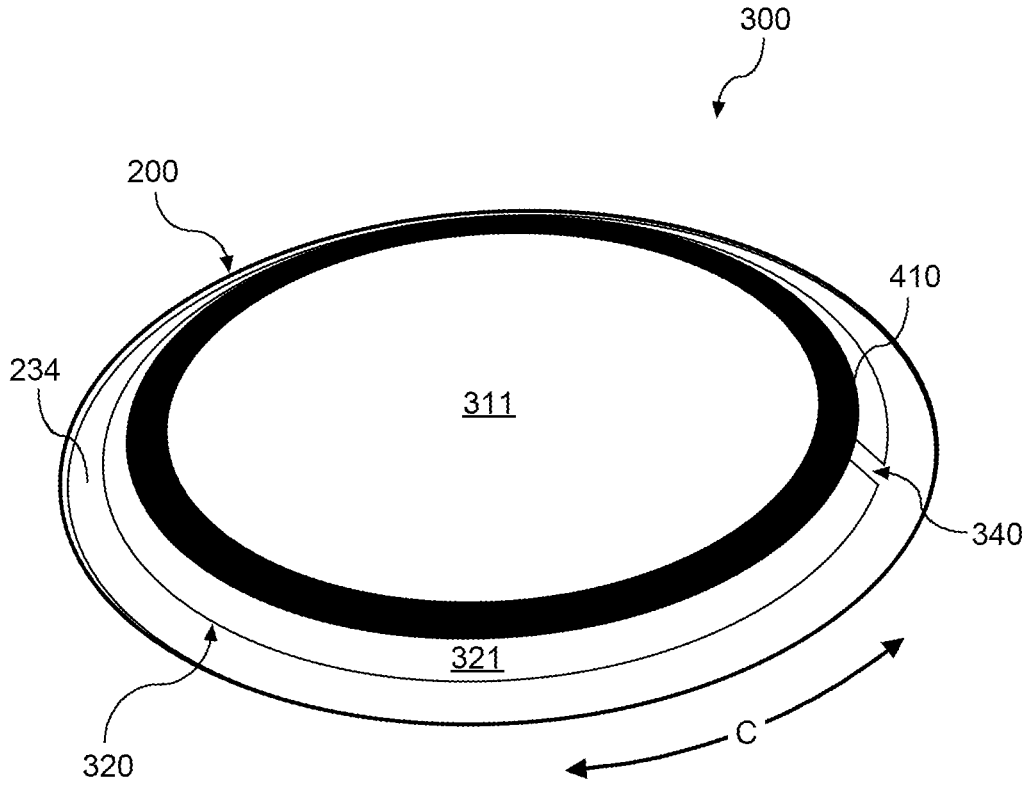
FIG. 9 depicts a perspective view of a display assembly according to an implementation of the present disclosure.
Figure 10:
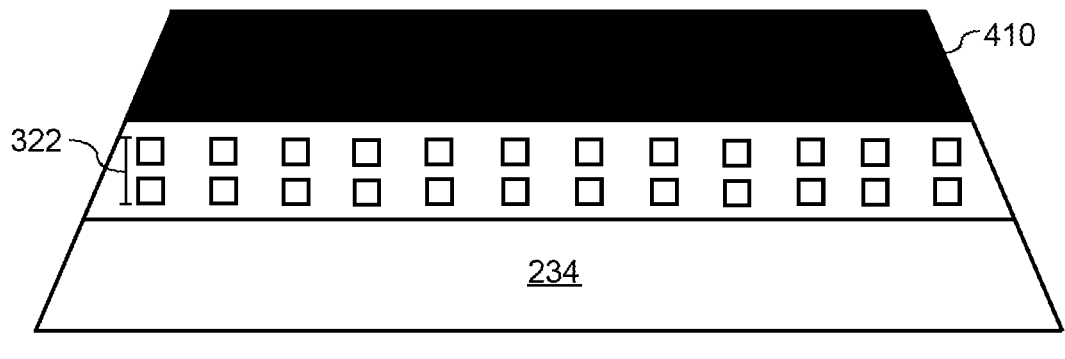
FIG. 10 depicts a peripheral portion of a three-dimensional display cover of the display assembly of FIG. 9 according to an implementation of the present disclosure.

Referring now to FIGS. 9 and 10, a display assembly 400 is provided according to another implementation of the present disclosure. It should be appreciated that the display assembly 400 can be substantially similar to the display assembly 300 depicted in FIGS. 6-8. For instance, the display assembly 400 depicted in FIG. 9 can include the three-dimensional display cover 200, the first display 310, and the second display 320. However, in contrast to the display assembly 300 depicted in FIGS. 6-8, the display assembly 400 in FIG. 9 can include a light blocking material 410 coupled to the peripheral portion 230 of the three-dimensional display cover 200 to cover the first region 232 (FIG. 8) of the peripheral portion 230 of the three-dimensional display cover 200 that is positioned between the first display 310 and the second display 320 with a light blocking material 410.

In some implementations, the light blocking material 410 can include an opaque material (e.g., black tape). In this manner, a user wearing a wearable computing device having the display assembly 400 cannot see into the internal volume 210 of the three-dimensional display cover 200 through the first region 232 (FIG. 8) of the peripheral portion 230 of the three-dimensional display cover 200. In alternative implementations, the light blocking material can include a semi-transparent material.

It should be appreciated that, in some implementations, the light blocking material 410 can be applied to peripheral portion 230 of the three-dimensional display cover 200 to additionally cover the second region 234 of the three-dimensional display cover 200. In such implementations, the internal volume 210 of the three-dimensional display cover 200 can be hidden from view of the user wearing a wearable computing device having the display assembly 400. In this manner, internal components of the display assembly 400 (e.g., display driver circuit(s) 330) can be hidden from view of the user and can improve the aesthetics of the wearable computing device.

Figure 11:
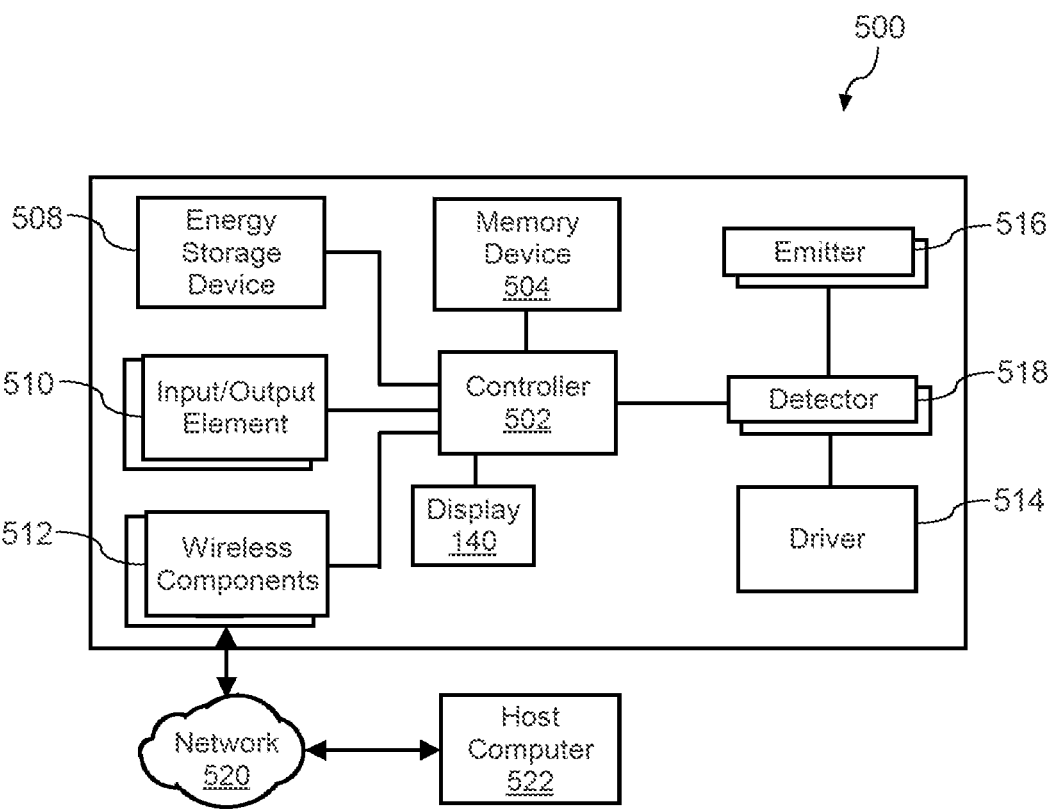
FIG. 11 depicts a block diagram of components of a computing system of a wearable computing device according to an implementation of the present disclosure.

Referring now to FIG. 11, components of an example computing system 500 of the wearable computing device 100 that can be utilized in accordance with various implementations are illustrated. In particular, as shown, the computing system 500 may also include at least one controller 502. Moreover, in an implementation, the controller(s) 502 can be a central processing unit (CPU) or graphics processing unit (GPU) for executing instructions that can be stored in a memory device 504, such as flash memory or DRAM, among other such options. For example, in an implementation, the memory device 504 may include RAM, ROM, FLASH memory, or other non-transitory digital data storage, and may include a control program comprising sequences of instructions which, when loaded from the memory device 504 and executed using the controller(s) 502, cause the controller(s) 502 to perform the functions that are described herein.

The computing system 500 can include many types of memory, data storage, or computer-readable media, such as data storage for program instructions for execution by the controller or any suitable processor. The same or separate storage can be used for images or data, a removable memory can be available for sharing information with other devices, and any number of communication approaches can be available for sharing with other devices. In addition, as shown, the computing system 500 includes the display 140, which may be a touch screen, OLED, or liquid crystal display (LCD), although devices might convey information via other means, such as through audio speakers, projectors, or casting the display or streaming data to another device, such as a mobile phone, wherein an application on the mobile phone displays the data.

The computing system 500 can include one or more wireless networking components 412 operable to communicate with one or more electronic devices within a communication range of a particular wireless channel. The wireless channel can be any appropriate channel used to enable devices to communicate wirelessly, such as Bluetooth, cellular, NFC, Ultra-Wideband (UWB), or Wi-Fi channels. It should be understood that the computing system 500 can have one or more conventional wired communications connections as known in the art.

The computing system 500 also includes one or more power components 508, operable to be recharged through conventional plug-in approaches. In some implementations, the computing system 500 can also include at least one additional I/O device 510 able to receive conventional input from a user. This conventional input can include, for example, a push button, touch pad, touch screen, wheel, joystick, keyboard, mouse, keypad, or any other such device or element whereby a user can input a command to the computing system 500. In some implementations, the I/O device(s) 510 can be connected by a wireless infrared or Bluetooth or other link as well in some implementations. In some implementations, the computing system 500 can include a microphone or other audio capture element that accepts voice or other audio commands. In some implementations, the I/O device(s) 510 can include one or more electrodes, optical sensors, barometric sensors (e.g., altimeter, etc.), and the like.

The computing system 500 can include a driver 514 and at least some combination of one or more emitters 516 and one or more detectors 518 for measuring data for one or more metrics of a human body, such as for a person wearing the wearable computing device 100. In some implementations, for example, this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Further image capture elements may also include depth sensors. Methods for capturing images using a camera element with a computing device are well known in the art and will not be discussed herein in detail. It should be understood that image capture can be performed using a single image, multiple images, periodic imaging, continuous image capturing, image streaming, etc. Further, the computing system 500 can include the ability to start and/or stop image capture, such as when receiving a command from a user, application, or other device.

The emitters 516 and the detectors 518 may also be capable of being used, in one example, for obtaining optical photoplethysmogram (PPG) measurements. Some PPG technologies rely on detecting light at a single spatial location, or adding signals taken from two or more spatial locations. Both of these approaches result in a single spatial measurement from which the heart rate (HR) estimate (or other physiological metrics) can be determined. In some implementations, a PPG device employs a single light source coupled to a single detector (i.e., a single light path). Alternatively, a PPG device may employ multiple light sources coupled to a single detector or multiple detectors (i.e., two or more light paths). In other implementations, a PPG device employs multiple detectors coupled to a single light source or multiple light sources (i.e., two or more light paths). In some cases, the light source(s) may be configured to emit one or more of green, red, infrared (IR) light, as well as any other suitable wavelengths in the spectrum (such as long IR for metabolic monitoring). For example, a PPG device may employ a single light source and two or more light detectors each configured to detect a specific wavelength or wavelength range. In some cases, each detector is configured to detect a different wavelength or wavelength range from one another. In other cases, two or more detectors are configured to detect the same wavelength or wavelength range. In yet another case, one or more detectors configured to detect a specific wavelength or wavelength range different from one or more other detectors). In implementations employing multiple light paths, the PPG device may determine an average of the signals resulting from the multiple light paths before determining an HR estimate or other physiological metrics.

Moreover, in an implementation, the emitters 516 and detectors 518 may be coupled to the controller 502 directly or indirectly using driver circuitry by which the controller 502 may drive the emitters 516 and obtain signals from the detectors 518. The host computer 522 can communicate with the wireless networking components 512 via the one or more networks 520, which may include one or more local area networks, wide area networks, UWB, and/or internetworks using any of terrestrial or satellite links. In some implementations, the host computer 522 executes control programs and/or application programs that are configured to perform some of the functions described herein.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure cover such alterations, variations, and equivalents.

What is claimed is:

1. A display assembly, comprising:
a three-dimensional display cover defining an internal volume, the three-dimensional display cover including a central portion and peripheral portion, the peripheral portion extending around a periphery of the internal volume;
a first display disposed within the internal volume of the three-dimensional display cover and visible through the central portion of the three-dimensional display cover; and
a second display disposed within the internal volume of the three-dimensional display cover and extending around at least a portion of a periphery of the first display, the second display visible through the peripheral portion of the three-dimensional display cover, the second display being spaced apart from an edge of the three-dimensional display cover; and
a non-pixelated region extending between the second display and the edge of the three-dimensional display cover.

2. The display assembly of claim 1, wherein:
the first display is coupled to the central portion of the three-dimensional display cover; and
the second display is coupled to the peripheral portion of the three-dimensional display cover.

3. The display assembly of claim 1, further comprising:
a light blocking material disposed between the first display and the second display within the internal volume of the three-dimensional display cover, the light blocking material extending around the periphery of the first display.

4. The display assembly of claim 3, wherein the light blocking material includes an opaque material.

5. The display assembly of claim 1, wherein the second display extends around a portion of the periphery of the first display such that a gap is defined between a first end of the second display and a second end of the second display.

6. The display assembly of claim 1, wherein an outwardly facing display surface of the second display is oriented at an angle of 30 to 90 degrees with an outwardly facing display surface of the first display.

7. The display assembly of claim 1, wherein a height of the second display is greater than a height of the non-pixelated region.

8. The display assembly of claim 1, wherein a height of the non-pixelated region is less than 1 millimeter.

9. The display assembly of claim 1, further comprising:
one or more display driver circuits configured to control
a first plurality of pixels included in the first display and
a second plurality of pixels included in the second
display.

10. The display assembly of claim 1, wherein a total
number of pixels included in the first display is different than
a total number of pixels included in the second display.

11. A wearable computing device comprising:
a housing; and
a display assembly carried in the housing, the display
assembly comprising:
a three-dimensional display cover defining an internal
volume, the three-dimensional display cover includ-
ing a central portion and peripheral portion, the
peripheral portion extending around a periphery of
the internal volume;
a first display disposed within the internal volume of
the three-dimensional display cover and visible
through the central portion of the three-dimensional
display cover; and
a second display disposed within the internal volume of
the three-dimensional display cover and extending around at least a portion of a periphery of the first
display, the second display visible through the
peripheral portion of the three-dimensional display
cover, the second display being spaced apart from an
edge of the three-dimensional display cover,
wherein the display assembly further includes a non-
pixelated region between the second display and the
edge of the three-dimensional display cover.

12. The wearable computing device of claim 11, wherein:
the first display is coupled to the central portion of the
three-dimensional display cover; and
the second display is coupled to the peripheral portion of
the three-dimensional display cover.

13. The wearable computing device of claim 11, further
comprising:
a light blocking material disposed between the first dis-
play and the second display within the internal volume
of the three-dimensional display cover, the light block-
ing material extending around the periphery of the first
display.

* * * * *